United States Patent
Das et al.

(10) Patent No.: US 6,462,139 B1
(45) Date of Patent: Oct. 8, 2002

(54) SOLVENT-FREE FILM-FORMING COMPOSITIONS FOR CLEAR COATS

(75) Inventors: Suryya K. Das, Pittsburgh, PA (US); Matthew F. Hogge, Pittsburgh, PA (US); Soner Kilic, Gibsonia, PA (US); Masayuki Nakajima, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/437,618

(22) Filed: Nov. 10, 1999

(51) Int. Cl.$^7$ .................................................. C08F 8/30
(52) U.S. Cl. ........................... 525/329.9; 525/330.5; 525/329.5; 525/333.6; 524/497; 524/492; 524/430; 524/437
(58) Field of Search ................. 524/501, 507, 524/492, 493, 802, 813, 839, 847, 871, 872, 873; 525/165; 523/335, 336

(56) References Cited

U.S. PATENT DOCUMENTS

| | | | |
|---|---|---|---|
| 5,071,904 A | 12/1991 | Martin et al. | 524/458 |
| 5,379,947 A | 1/1995 | Williams et al. | 241/21 |
| 5,510,148 A | 4/1996 | Taljan et al. | 427/409 |
| 5,567,762 A | * 10/1996 | Coyard et al. | 524/590 |
| 5,910,563 A | 6/1999 | Jones et al. | 528/272 |
| 6,022,919 A | * 2/2000 | Komoto et al. | 524/430 |
| 6,251,985 B1 | * 6/2001 | Wamprecht et al. | 524/539 |
| 6,268,021 B1 | * 7/2001 | Flosbach et al. | 427/407.1 |

FOREIGN PATENT DOCUMENTS

| | | | |
|---|---|---|---|
| CA | 2203868 | 4/1997 | ......... C09D/175/04 |
| JP | 56100819 | 8/1981 | |

OTHER PUBLICATIONS

Kreis, Winfried, "Meeting Requirements for Automotive Primer–Surfacer and Clearcoat", Powder Coatings, Dec. 1998, pp. 12+.

Dr. W. Kries, *Aktueller Status bei der Pulverlackentwicklung fur die Automobilindustrie am Beispiel fuller und Klarlack*, presented by at the 1st International Conference of Car–Body Powder Coatings, Berlin, Germany, Jun. 22–23, 1998, reprinted in *Focus on Powder Coatings*, The Royal Society of Chemistry, Sep. 2–8, 1998.

* cited by examiner

*Primary Examiner*—David W. Wu
*Assistant Examiner*—Rip A Lee
(74) *Attorney, Agent, or Firm*—Deborah M. Altman

(57) ABSTRACT

Film-forming compositions which are substantially free of organic solvent and capable of forming a generally continuous film at ambient temperature are provided. The film-forming composition includes at least one thermosettable aqueous dispersion of polymeric microparticles having functionality adapted to react with a crosslinking agent. The polymeric microparticles are prepared by mixing under high shear conditions (1) at least one hydrophobic polymer having reactive functional groups; and (2) at least one hydrophobic crosslinking agent containing functional groups which are reactive with the functional groups of the polymer. Further provided is a multi-component composite coating composition which includes a pigmented base coat and a transparent topcoat of the substantially organic solvent-free film-forming composition described above. Substrates coated with the same are also provided. Additionally, a method for preparing the aqueous dispersion of polymeric microparticles is provided. The substantially organic solvent-free film-forming compositions of the invention are storage stable at room temperature and provide coatings with excellent appearance and performance properties such as adhesion and scratch resistance. The film-forming compositions are suitable for wet-on-wet application over a base coat with little or no mud-cracking.

27 Claims, No Drawings

SOLVENT-FREE FILM-FORMING COMPOSITIONS FOR CLEAR COATS

FIELD OF THE INVENTION

The present invention relates to film-forming compositions which are substantially free of organic solvent comprising polymeric microparticles which are useful as topcoats applied over a base coat. A method for preparing aqueous dispersions of polymeric microparticles which are employed in the film-forming compositions and substrates coated with such compositions also are provided.

BACKGROUND OF THE INVENTION

Color-plus-clear coating systems involving the application of a colored or pigmented base coat to a substrate followed by application of a transparent or clear topcoat over the base coat have become increasingly popular as original finishes for automobiles. The color-plus-clear systems have outstanding appearance properties such as gloss and distinctness-of image, due in large part to the clear coat.

The most economically attractive color-plus-clear systems are those in which the clear coat composition can be applied directly over the uncured colored base coat. The process of applying one layer of a coating before the previous layer is cured, then simultaneously curing both layers, is referred to as a wet-on-wet ("WOW") application. Color-plus-clear coating systems suitable for WOW application provide a substantial energy cost savings advantage.

Over the past decade, there has been an effort to reduce atmospheric pollution caused by volatile solvents which are emitted during the painting process. However, it is often difficult to achieve high quality, smooth coating finishes, particularly clear coating finishes, such as are required in the automotive industry, without including organic solvents which contribute greatly to flow and leveling of a coating. In addition to achieving near-flawless appearance, automotive coatings must be durable and chip resistant, yet economical and easy to apply.

The use of powder coatings to eliminate the emission of volatile solvents during the painting process has become increasingly attractive. Powder coatings have become quite popular for use in coatings for automotive components, for example, wheels, axle parts, seat frames and the like. Use of powder coatings for clear coats in color-plus-clear systems, however, is somewhat less prevalent for several reasons. First, powder coatings require a different application technology than conventional liquid coating compositions and, thus, require expensive modifications to application lines. Also, the high standard of automotive clear coats is, for the most part, set by polyurethane systems, which are typically cured at temperatures below 140° C. Most powder coating formulations require a much higher curing temperature. Further, many powder coating compositions tend to yellow more readily than conventional liquid, clear coating compositions, and powder clear coating compositions generally result in clear coatings having a high cured film thickness, typically ranging from 60 to 70 microns.

U.S. Pat. No. 5,379,947 discloses a process for producing a powder slurry coating composition wherein the powder particle size does not exceed 100 micrometers and at least 50 percent of the powder particles are of a size ranging from 3 to 5 micrometers. The powder slurry coating compositions can include any of a variety of polymeric resins including acrylic, epoxy, amine-modified, phenolic, saturated or unsaturated polyester, urea, urethane and blocked isocyanate resins, or mixtures thereof. After milling, the powder is added to a mixture of water and surfactants, followed by the subsequent addition of dispersants and rheology control agents, thereby forming a powder slurry. The powder slurry coating compositions are useful for both base coat and clear coat applications.

Powder in slurry form for automotive clear coatings can overcome many of the disadvantages of dry powder coatings, however, powder slurry compositions often tend to be unstable and settle upon storage at temperatures above 20° C. Further, WOW application of powder slurry clear coating compositions over conventional base coats can result in mud-cracking of the system upon curing. See *Aktueller Status bei der Pulverlackentwickluna fur die Automobilindustrie am Beispiel fuller und Klarlack*, presented by Dr. W. Kries at the 1st International Conference of Car-Body Powder Coatings, Berlin, Germany, Jun. 22–23, 1998, reprinted in Focus on Powder Coatings, The Royal Society of Chemistry, Sep. 2–8, 1998.

Generally, any film that contains a volatile component such as water must undergo a decrease in volume as the volatile component evaporates from the surface of the film. As the volatile component leaves the film, contraction forces act to pull the film inward in all directions. However, without intending to be bound by any theory, it is believed that if the film has sufficient cohesive strength, the film will contract in only one dimension, that is, the film thickness will decrease while the film resists contraction in any direction parallel to the substrate surface. By contrast, if a film lacks cohesive strength sufficient to resist contraction parallel to the substrate surface, contraction forces will cause the film to break up into small flat segments that are separated by continuous linear voids. This surface defect is commonly referred to as "mud-cracking".

An aqueous coating that forms a powder upon application at ambient temperature cannot readily coalesce to form a generally continuous film until subjected to thermal cure conditions. The tendency of such coatings to form mud-cracks upon curing is believed to be due to lack of sufficient cohesive strength resulting from the inability of the powder particles to readily coalesce prior to thermal curing.

Canadian Patent Application No. 2,203,868 discloses a process for preparing aqueous dispersions which form powder coatings at ambient temperature. The dispersions are comprised of a polyol component having a Tg of greater than 30° C. which may be hydrophilically modified, and a blocked isocyanate crosslinker which may be hydrophilically modified. The dispersion components are prepared in the presence of organic solvent, which is removed by a distillation step. Although applied as conventional waterborne coating compositions, these dispersions form powder coatings at ambient temperature which require a ramped bake prior to undergoing conventional curing conditions in order to effect a coalesced and continuous film on the substrate surface. As discussed above, since these materials are in powder form at ambient temperatures, they can exhibit mud-cracking upon curing.

U.S. Pat. No. 5,071,904 discloses a waterborne coating composition which comprises a dispersion of polymeric microparticles in an aqueous medium. The microparticles contain a substantially hydrophobic polymer, which is essentially free of repeating acrylic or vinyl units in the backbone and is adapted to be chemically bound into the cured coating composition. The disclosed microparticles do not comprise a hydrophobic crosslinker, that is, a crosslinker such as a blocked polyisocyanate or a fully butylated melamine, which is not soluble or dispersible in water. Moreover, the coating compositions, while waterborne, typically contain a substantial amount of organic solvent to provide flow and coalescence to the applied coating.

The automotive industry would derive a significant economic benefit from an essentially organic solvent-free clear coating composition which meets the stringent automotive appearance and performance requirements. Also, it would be advantageous to provide an organic solvent-free clear coat composition which can be applied by conventional application means over an uncured pigmented base coating composition (i.e., via WOW application) to form a generally continuous film at ambient temperature which provides a cured film free of mud-cracking.

SUMMARY OF THE INVENTION

The present invention provides a film-forming composition which is substantially free of organic solvent and capable of forming a generally continuous film at ambient temperature. The film-forming composition comprises at least one thermosettable aqueous dispersion comprising polymeric microparticles having functionality adapted to react with a crosslinking agent. The polymeric microparticles are prepared by mixing under high shear conditions (1) at least one hydrophobic polymer having reactive functional groups; and (2) at least one hydrophobic crosslinking agent containing functional groups which are reactive with the functional groups of (1). A multi-component composite coating composition comprising a base coat deposited from a pigmented film-forming composition and a transparent topcoat applied over the base coat in which the topcoat is deposited from the film-forming composition described above also is provided. Substrates coated with the same also are provided. Additionally, a method for preparing the thermosettable aqueous dispersion of polymeric microparticles is provided.

Other than in the operating examples, or where otherwise indicated, all numbers expressing quantities of ingredients, reaction conditions, and so forth used in the specification and claims are to be understood as being modified in all instances by the term "about". Also, as used herein, the term "polymer" is meant to refer to oligomers and both homopolymers and copolymers.

DETAILED DESCRIPTION OF THE PREFERRED EMBODIMENTS

The film-forming composition of the present invention is substantially free of organic solvent. By "substantially free" is meant that the amount of organic solvent present in the composition is less than 10 weight percent, preferably less than 5 weight percent, and more preferably less than 2 weight percent based on total weight of the film-forming composition to provide low volatile organic emissions during application. It should be understood, however, that a small amount of organic solvent can be present in the composition, for example to improve flow and leveling of the applied coating or to decrease viscosity as needed.

The film-forming composition of the present invention forms a generally continuous film at ambient conditions (i.e., approximately 23°–28° C. at 1 atmosphere pressure). A "generally continuous film" is formed upon coalescence of the applied coating composition to form a generally uniform coating upon the surface to be coated. By "coalescence" is meant the tendency of individual particles or droplets of the coating composition, such as would result upon atomization of a liquid coating when spray applied, to flow together on the substrate surface thereby forming a continuous film upon the substrate, i.e., a coating which is substantially free from voids, discontinuities or areas of very low film thickness between the coating particles.

The film-forming composition of the invention comprises at least one thermosettable aqueous dispersion comprising polymeric microparticles having a functionality adapted to react with a crosslinking agent.

As used herein, the term "dispersion" means that the microparticles are capable of being distributed throughout water as finely divided particles, such as a latex. See *Hawley's Condensed Chemical Dictionary*, (12th Ed. 1993) at page 435, which is hereby incorporated by reference. The uniformity of the dispersion can be increased by the addition of wetting, dispersing or emulsifying agents (surfactants), which are discussed below.

The polymeric microparticles are prepared by mixing together under high shear conditions (1) at least one substantially hydrophobic polymer having reactive functional groups, and preferably, acid functional groups; and (2) at least one hydrophobic crosslinking agent containing functional groups reactive with the functional groups of the polymer (1).

The microparticles preferably comprise, as component (1), at least one substantially hydrophobic polymer having reactive functional groups and, preferably, acid functional groups such as carboxylic acid functional groups. As used herein, the phrase "acid functional" means that the polymer (1) contains groups which can give up a proton to a base in a chemical reaction; a substance that is capable of reacting with a base to form a salt; or a compound that produces hydronium ions, $H_3O^+$, in aqueous solution. See *Hawley's* at page 15 and K. Whitten et al., *General Chemistry*, (1981) at page 192, which are hereby incorporated by reference.

The term "substantially hydrophobic", as used herein, means that the polymer is essentially not compatible with, does not have an affinity for and/or is not capable of dissolving in water using conventional mixing means. That is, upon mixing a sample of the polymer with an organic component and water, a majority of the polymer is in the organic phase and a separate aqueous phase is observed. See *Hawley's Condensed Chemical Dictionary*, (12th Ed. 1993) at page 618.

Typically, the acid value of the hydrophobic polymer (1) is below 50, preferably the acid value is below 25, more preferably ranging from 10 to 20. The amount of acid functionality in a resin can be measured by acid value. As used herein and in the claims, "acid value" refers to the number of milligrams of KOH per gram (mg KOH/g) of solid required to neutralize the acid functionality in the resin. In order for the hydrophobic polymer to be substantially hydrophobic, the hydrophobic polymer must not contain enough acid or ionic functionality to allow it to form stable dispersions in water using conventional dispersion techniques. Also it should be understood that in the case where the acid value of the hydrophobic polymer is about 0, a suitable surfactant can be used to stably disperse the polymer in aqueous media by applying high stress techniques. Anionic, cationic and nonionic surfactants are suitable for use in the aqueous dispersions of the present invention, with anionic surfactants being preferred. Nonlimiting examples of suitable anionic surfactants include the dimethylethanolamine salt of dodecylbenzenesulfonic acid, sodium dioctylsulfosuccinate, salts of ethoxylated nonylphenol sulfate and sodium dodecyl benzene sulfonate. Polymeric surfactants also can be used. The above-described surfactants are typically present in the dispersion in an amount of less than 2 percent by weight, preferably less than 1 percent by weight based on total resin solids weight present in the dispersion.

Hydrophobic polymers having low acid values can be considered to be water-dispersible if they contain other hydrophilic components, such as hydroxyl groups or poly (ethylene oxide) groups, in an amount sufficient to effectuate dispersibility of the polymer in aqueous media. However, it should be understood that for purposes of the present invention, such polymers are not considered to be substantially hydrophobic if they are water-dispersible, regardless of their acid value.

The substantially hydrophobic polymer (1) can be formed by polymerizing one or more ethylenically unsaturated carboxylic acid functional group-containing monomers and one or more other ethylenically unsaturated monomers free of carboxylic acid functional groups. Preferably, at least one of the other ethylenically unsaturated monomers free of carboxylic acid functional groups contains reactive functional groups, for example hydroxyl and/or carbamate functional groups.

Non-limiting examples of useful ethylenically unsaturated carboxylic acid functional group-containing monomers include (meth)acrylic acid, beta-carboxyethyl acrylate, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof. As used herein, "(meth)acrylic" and terms derived therefrom are intended to include both acrylic and methacrylic. Preferred ethylenically unsaturated carboxylic acid monomers are (meth)acrylic acids.

Non-limiting examples of useful other ethylenically unsaturated monomers free of carboxylic acid functional groups include vinyl monomers such as alkyl esters of acrylic and methacrylic acids, for example, ethyl (meth) acrylate, methyl (meth)acrylate, butyl (meth)acrylate, 2-ethylhexyl (meth)acrylate, 2-hydroxyethyl (meth)acrylate, hydroxypropyl (meth)acrylate, hydroxy butyl (meth) acrylate, isobornyl (meth)acrylate and lauryl (meth)acrylate; vinyl aromatics such as styrene and vinyl toluene; (meth) acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

In a preferred embodiment of the invention, the ethylenically unsaturated monomers free of carboxylic acid functional groups include ethylenically unsaturated, beta-hydroxy ester functional monomers, such as those derived from the reaction of an ethylenically unsaturated acid functional monomer, such as a monocarboxylic acid, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols such as butyl glycidyl ether, octyl glycidyl ether, phenyl glycidyl ether and the like. Preferred epoxy compounds include those having the following structure (I):

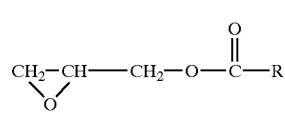

where R is a hydrocarbon radical containing from 4 to 26 carbon atoms. Suitable glycidyl esters include those which are commercially available from Shell Chemical Company under the tradename CARDURA E and from Exxon Chemical Company under the tradename GLYDEXX-10.

Alternatively, the beta-hydroxy ester functional monomers are prepared from an ethylenically unsaturated, epoxy functional monomer, for example glycidyl (meth)acrylate and allyl glycidyl ether, and a saturated carboxylic acid, such as a saturated monocarboxylic acid, for example isostearic acid.

Acrylic monomers such as butyl acrylate, lauryl methacrylate, or 2-ethylhexyl acrylate are preferred due to the hydrophobic nature and low glass transition temperature ($T_g$) of the polymers that they produce.

Carbamate functional groups may be incorporated into the substantially hydrophobic polymer (1) by co-polymerizing the above-described ethylenically unsaturated monomers with a carbamate functional vinyl monomer, for example a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers are, for instance, the reaction product of hydroxyethyl methacrylate, isophorone diisocyanate, and hydroxypropyl carbamate. Still other carbamate functional vinyl monomers may be used, such as the reaction product of isocyanic acid (HNCO) with a hydroxyl functional acrylic or methacrylic monomer such as hydroxyethyl acrylate, and those carbamate functional vinyl monomers described in U.S. Pat. No. 3,479,328. Pendant carbamate groups can also be incorporated into the polymer by a "transcarbamoylation" reaction in which a hydroxyl functional polymer is reacted with a low molecular weight carbamate derived from an alcohol or a glycol ether. The carbamate groups exchange with the hydroxyl groups yielding the carbamate functional acrylic polymer and the original alcohol or glycol ether. Also, hydroxyl functional polymers can be reacted with isocyanic acid yielding pendant carbamate groups. Note that the production of isocyanic acid is disclosed in U.S. Pat. No. 4,364,913. Likewise, hydroxyl functional acrylic polymers can be reacted with urea to give an acrylic polymer with pendant carbamate groups.

In a preferred embodiment, the polymer (1) is pre-formed then combined with the hydrophobic crosslinking agent (2), which is discussed in detail below, and added to an aqueous medium to form a pre-emulsion mixture. Generally, a neutralizing agent is added to the polymer/crosslinking agent mixture prior to combining with the aqueous medium to facilitate the dispersion. Alternatively, the polymer (1) is formed by free radical-initiated polymerization in the presence of the hydrophobic crosslinking agent (2). It should be understood that when the polymer (1) is prepared in the presence of the hydrophobic crosslinker (2), the final reaction product is taken to have the same composition, characteristics, and physical properties as if pre-formed under conventional free-radical polymerization conditions.

Suitable methods for homo- and co-polymerizing ethylenically unsaturated monomers and/or other addition polymerizable monomers and preformed polymers are well known to those skilled in the art of polymers and further discussion thereof is not believed to be necessary in view of the present disclosure. For example, polymerization of the ethylenically unsaturated monomers can be carried out in bulk, in aqueous or organic solvent solution such as xylene, methyl isobutyl ketone and n-butyl acetate, in emulsion, or in aqueous dispersion. *Kirk-Othmer Encyclopedia of Chemical Technology*, Vol. 1 (1963) at page 305. The polymerization can be effected by means of a suitable initiator system, which typically includes free radical initiators such as benzoyl peroxide or azobisisobutyronitrile. Molecular weight can be controlled by choice of solvent or polymerization medium, concentration of initiator or monomer, temperature, and the use of chain transfer agents. If additional information is needed, such polymerization methods are disclosed in *Kirk-Othmer*, Vol. 1 at pages 203–205, 259–297 and 305–307, which is hereby incorporated by reference.

The number average molecular weight of the pre-formed hydrophobic polymer (1) can range from about 500 to about 100,000, and preferably about 1,000 to about 10,000. Unless indicated otherwise, molecular weights, as used herein and in the claims, are expressed as number average molecular weights as determined by gel permeation chromatography using polystyrene as a standard.

The glass transition temperature ($T_g$) of the hydrophobic polymer (1) is typically less than 100° C., preferably less than 50° C., more preferably less than 35° C., even more preferably less than 30° C., and most preferably less than 25° C. The Tg of the hydrophobic polymer (1) is also typically at least −50° C., preferably at least −25° C., more preferably at least −20° C., even more preferably at least −10° C., and most preferably at least 0° C. The Tg of the hydrophobic polymer (1) can range between any combination of these values inclusive of the recited ranges.

The amount of the polymer (1) present in the thermosettable dispersion typically ranges from at least 10 to at least 20 weight percent, preferably from at least 20 to at least 30 weight percent, and more preferably from at least 30 to at least 40 weight percent based on total resin solids weight of the thermosettable dispersion. The amount of the hydrophobic polymer (1) present in the thermosettable dispersion typically ranges from less than 90 to less than 80 weight percent, preferably less than 80 to less than 70, and more preferably less than 70 to less than 60 weight percent based on total resin solids weight of the thermosettable dispersion. The amount of the hydrophobic polymer (1) present in the thermosettable dispersion can range between any combination of these values inclusive of the recited ranges.

The microparticles also comprise at least one hydrophobic crosslinking agent (2) which contains functional groups reactive with the functional groups of the hydrophobic polymer (1). Selection of hydrophobic crosslinking agents suitable for use in the thermosettable dispersions of the present invention is dependent upon the reactive functional groups associated with component (1).

Preferred hydrophobic crosslinking agents include blocked polyisocyanates which are useful for crosslinking hydroxyl and/or amine functional group-containing materials. Polyisocyanates which are preferred for use as the hydrophobic crosslinking agent (2) in the present invention are reversibly blocked polyisocyanates. Examples of suitable polyisocyanates which can be utilized herein include reversibly blocked (cyclo)aliphatic polysiocyanates containing biuret and/or isocyanurate groups, which may optionally also contain allophanate groups. Specific examples of such polyisocyanates include 1,6-hexamethylene diisocyanate, 1-isocyanato-3,3,5-trimethyl-5-isocyanatomethylcyclohexane (i.e., isophorone diisocyanate), 2,4-and/or 2,6-diisocyanato-1-methylcyclohexane (hydrogenated toluene diisocyanate) and 4,4'-diisocyanatodicyclohexylmethane. The hydrophobic crosslinking agent (2) is typically prepared by reversibly blocking the above-described polyisocyanates with blocking agents in a manner well known to those skilled in the art. As used herein, the term "reversibly blocked" is intended to mean that the blocking agents unblock or dissociate at elevated temperatures, that is, temperatures ranging from 40° to 200° C. Examples of suitable blocking agents can include lower aliphatic alcohols such as methanol, oximes such as methyl ethyl ketoxime and lactams such as caprolactam. Other suitable blocking agents include 1,2,4-triazole, dimethyl-1,2,4-triazole, 3,5-dimethylpyrazole and imidazole. Mixtures of the above-mentioned blocking agents can also be used. In a preferred embodiment of the invention, the substantially hydrophobic crosslinking agent (2) comprises the isocyanurate of 1,6-hexamethylene diisocyanate which has been reversibly blocked with 3,5-dimethyl pyrazole.

Suitable hydrophobic crosslinking agents for crosslinking hydroxyl and/or carbamate functional group-containing materials include aminoplast resins. Aminoplast resins are based on the condensation products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5 triazine, and the like.

While the aldehyde employed is most often formaldehyde, other similar condensation products can be made from other aldehydes, such as acetaldehyde, crotonaldehyde, acrolein, benzaldehyde, furfural, glyoxal and the like.

The aminoplast resins preferably contain methylol or other alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols, and halogen-substituted or other substituted alcohols, such as 3-chloropropanol and butoxyethanol. Commonly employed aminoplast resins are substantially alkylated with methanol or butanol. Preferred aminoplast resins for use as the hydrophobic crosslinking agent (2) in the thermosettable dispersion of the present invention include those which are fully alkylated with butanol, such as CYMEL 1156 which is commercially available from Cytec Industries, Inc.

Also known in the art for crosslinking hydroxyl functional group-containing materials are triazine compounds such as the tricarbamoyl triazine compounds which are described in detail in U.S. Pat. No. 5,084,541, which is incorporated herein by reference.

If desired, mixtures of the above hydrophobic crosslinking agents can be used.

The amount of the hydrophobic crosslinking agent (2) present in the thermosettable dispersion prior to crosslinking with the functional groups of the hydrophobic polymer (1) typically is at least 5 to at least 15 weight percent, preferably at least 15 to at least 25 weight percent, and more preferably at least 25 to at least 35 weight percent based on total resin solids weight of the thermosettable dispersion. The amount of the hydrophobic crosslinking agent (2) present in the thermosettable dispersion typically is also less than 90 to less than 80 weight percent, preferably less than 80 to less than 70 weight percent, and more preferably less than 70 to less than 60 weight percent based on total resin solids weight of the thermosettable dispersion. The amount of the hydrophobic crosslinking agent (2) present in the thermosettable dispersion can range between any combination of these values inclusive of the recited ranges.

As aforementioned, the dispersion of polymeric microparticles is prepared by mixing together the above-described components (1) and (2) under high shear conditions. As used herein, the term "high shear conditions" is meant to include not only high stress techniques, such as by the liquid-liquid impingement techniques discussed in detail below, but also high speed shearing by mechanical means. It should be understood that, if desired, any mode of applying stress to the pre-emulsification mixture can be utilized so long as sufficient stress is applied to achieve the requisite particle size distribution.

Generally, the dispersion is prepared as follows. The hydrophobic polymer (1) and the hydrophobic crosslinking agent (2) and, if desired, other ingredients such as neutralizing agents, external surfactants, catalysts, flow additives and the like are mixed together with water under agitation to form a semi-stable oil-in-water pre-emulsion mixture. Although the pre-emulsion mixture can be stabilized using external surfactants, for purposes of the present invention this is not preferred. The pre-emulsion mixture is then subjected to sufficient stress to effect formation of polymeric microparticles of uniformly fine particle size. Residual organic solvents are then removed azeotropically under reduced pressure distillation at low temperature (i.e., less than 40° C.) to yield a substantially organic solvent-free stable dispersion of polymeric microparticles.

For the present application, the pre-formed, substantially hydrophobic polymer (1) (or the ethylenically unsaturated monomers used to prepare the polymer (1)) together with the hydrophobic crosslinker (2) are referred to as the organic component. The organic component generally also comprises other organic species.

The dispersions of the present invention typically are prepared as oil-in-water emulsions. That is, the aqueous medium provides the continuous phase in which the polymeric microparticles are suspended as the organic phase.

The aqueous medium generally is exclusively water. However, for some polymer systems, it can be desirable to also include a minor amount of inert organic solvent which can assist in lowering the viscosity of the polymer to be dispersed. Typically, the amount of organic solvent present in the aqueous dispersion of the present invention is less than 20 weight percent, preferably less than 5 weight percent and more preferably less than 2 weight percent based on total weight of the dispersion. For example, if the organic phase has a Brookfield viscosity greater than 1000 centipoise at 25° C. or a W Gardner Holdt viscosity, some solvent can be used. Examples of suitable solvents which can be incorporated in the organic component are xylene, methyl isobutyl ketone and n-butyl acetate.

As was mentioned above, the mixture preferably is subjected to the appropriate stress by use of a MICROFLUIDIZER® emulsifier which is available from Microfluidics Corporation in Newton, Massachusetts. The MICROFLUIDIZER® high-pressure impingement emulsifier is described in detail in U.S. Pat. No. 4,533,254, which is hereby incorporated by reference. The device consists of a high-pressure (up to about $1.4 \times 10^5$ kPa (20,000 psi)) pump and an interaction chamber in which emulsification takes place. The pump forces the mixture of reactants in aqueous medium into the chamber where it is split into at least two streams which pass at very high velocity through at least two slits and collide, resulting in the formation of small particles. Generally, the pre-emulsion mixture is passed through the emulsifier at a pressure of between about $3.5 \times 10^4$ and about $1 \times 10^5$ kPa (5,000 and 15,000 psi). Multiple passes can result in smaller average particle size and a narrower range for the particle size distribution. When using the aforesaid MICROFLUIDIZER® emulsifier, stress is applied by liquid-liquid impingement as has been described. As mentioned above other modes of applying stress to the pre-emulsification mixture can be utilized so long as sufficient stress is applied to achieve the requisite particle size distribution. For example, one alternative manner of applying stress would be the use of ultrasonic energy.

Stress is described as force per unit area. Although the precise mechanism by which the MICROFLUIDIZER® emulsifier stresses the pre-emulsification mixture to particulate it is not thoroughly understood, it is theorized that stress is exerted in more than one manner. It is believed that one manner in which stress is exerted is by shear, that is, the force is such that one layer or plane moves parallel to an adjacent, parallel plane. Stress can also be exerted from all sides as a bulk, compression stress. In this instance stress could be exerted without any shear. A further manner of producing intense stress is by cavitation. Cavitation occurs when the pressure within a liquid is reduced enough to cause vaporization. The formation and collapse of the vapor bubbles occurs violently over a short time period and produces intense stress. Although not intending to be bound by any particular theory, it is believed that both shear and cavitation contribute to producing the stress which particulates the pre-emulsification mixture.

As discussed above, the substantially hydrophobic polymer (1) alternatively can be prepared in the presence of the hydrophobic crosslinker (2). If this method is employed, the polymerizable ethylenically unsaturated monomers used to prepare the hydrophobic polymer (1) and the hydrophobic crosslinker (2) are typically combined with a surfactant and blended with an aqueous medium to form a pre-emulsion mixture. The pre-emulsion mixture is then subjected to high stress conditions as described above to form microparticles. The polymerizable species within each particle are subsequently polymerized under conditions sufficient to produce polymeric microparticles which are stably dispersed in the aqueous medium.

Preferably, a surfactant or dispersant is present to stabilize the dispersion. The surfactant is preferably present when the organic component referred to above is mixed into the aqueous medium prior to formation of the microparticles. Alternatively, the surfactant can be introduced into the medium at a point just after the microparticles have been formed. The surfactant, however, can be an important part of the particle forming process and is often necessary to achieve the requisite dispersion stability. The surfactant also can be employed to prevent the emulsified particles from forming agglomerates.

Anionic, cationic and nonionic surfactants such as those discussed above are suitable for use in the aqueous dispersions of the present invention, with anionic surfactants being preferred. Other materials well known to those skilled in the art are also suitable for use herein. Generally, both ionic and non-ionic surfactants are used together and the amount of surfactant ranges from about 1 percent to about 10 percent, preferably less than 2 percent, the percentage based on the total solids.

In order to conduct the polymerization of the ethylenically unsaturated monomers in the presence of the hydrophobic crosslinker, a free radical initiator is usually present. Both water-soluble and oil soluble initiators can be used Examples of water-soluble initiators include ammonium peroxydisulfate, potassium peroxydisulfate and hydrogen peroxide. Examples of oil soluble initiators include t-butyl hydroperoxide, dilauryl peroxide and 2,2'-azobis (isobutyronitrile). Generally, the reaction is carried out at a temperature ranging from 20° to 80° C. The polymerization can be carried out in either a batch or a continuous process. The length of time necessary to carry out the polymerization can range from 10 minutes to 6 hours. The processes by which the polymeric microparticles can be formed are described in detail in U.S. Pat. No. 5,071,904 which is incorporated herein by reference.

Once the microparticles have been formed and the polymerization process is complete, the resultant product is a stable dispersion of polymeric microparticles in an aqueous medium which can contain some organic solvent. The organic solvent is typically removed via reduced pressure distillation at a temperature of less than 40° C. The final product is a stable dispersion, substantially free of organic solvent, wherein both the substantially hydrophobic polymer (1) and the substantially hydrophobic crosslinking agent (2) comprise each microparticle. By "stably dispersed" is meant that the polymeric microparticles neither settle nor coagulate nor flocculate upon standing. As was stated above, a very important aspect of the polymeric microparticle dispersions is that the particle size is uniformly small. Generally, the microparticles have a mean ranging diameter from about 0.01 micrometers to about 10 micrometers. Preferably the mean diameter of the particles after polymerization ranges from about 0.05 micrometer to about 0.5 micrometer. The particle size can be measured with a particle size analyzer such as the Coulter N4 instrument commercially available from Coulter.

The themosettable aqueous dispersions of polymeric microparticles as described above are useful as components in film-forming compositions. The amount of the thermosettable dispersion resin solids typically present in the film-forming composition of the present invention typically ranges from at least 30 to at least 40 weight percent, preferably from at least 40 to at least 50 weight percent, and more preferably from at least 50 to at least 60 weight percent based on total resin solids weight of the film-forming composition. The amount of the thermosettable dispersion present in the film-forming composition of the invention also can range from less than 99 to less than 85 weight percent, preferably less than 85 to less than 80, and more preferably less than 80 to less than 70 weight percent based on total resin solids weight of the film-forming composition. The amount of the thermosettable dispersion present in the film-forming composition can range between any combination of these values inclusive of the recited ranges.

The film-forming composition also can further comprise one or more hydrophilic crosslinking agents which are adapted to react with the functional groups of the polymeric microparticles to provide additional curing of the film-forming composition, if desired. Non-limiting examples of suitable crosslinking agents include blocked polyisocyanates and aminoplast resins as are described generally above which are hydrophilically modified or otherwise adapted to be water-soluble or water dispersible as described below. The hydrophilic crosslinking agent or mixture of crosslinking agents used in the film-forming composition is dependent upon the functionality associated with the polymeric microparticles. Preferably, the polymeric microparticles are hydroxyl and/or carbamate functional and the hydrophilic crosslinking agent, when employed, is a hydrophilically modified blocked polyisocyanate or aminoplast.

As aforementioned, the crosslinking agent which is useful as a component in the film-forming composition of the invention is preferably hydrophilic, that is, it has been adapted to be water-soluble or water dispersible. For example, a hydrophilic blocked polyisocyanate suitable for use as the hydrophilic crosslinking agent is 3,5-dimethyl pyrazole blocked hydrophically modified isocyanurate of 1,6-hexamethylene diisocyanate which is commercially available as BI 7986 from Baxenden Chemicals, Ltd. in Lancashire, England. Exemplary of suitable aminoplast resins are those which contain methylol or similar alkylol groups, a portion of which have been etherified by reaction with a lower alcohol, preferably methanol, to provide a water-soluble/dispersible aminoplast resin, For example, the partially methylated aminoplast resin, CYMEL 385, which is commercially available from Cytec Industries, Inc.

Preferred hydrophilic crosslinking agents include hydrophilically modified blocked polyisocyanates.

When employed, the hydrophilic crosslinking agent typically is present in the film-forming composition in an amount ranging from 0 to at least 10 weight percent, preferably at least 10 to at least 20 weight percent, and more preferably from at least 20 to at least 30 weight percent based on total resin solids weight in the film-forming composition. The crosslinking agent also is typically present in the film-forming composition in an amount ranging from less than 70 to less than 60 weight percent, preferably from less than 60 to less than 50 weight percent, and more preferably from less than 50 to less than 40 weight percent based on total resin solids weight of the film-forming composition. The hydrophilic crosslinking agent can be present in the film-forming composition in an amount ranging between any combination of these values inclusive of the recited ranges.

In an alternative embodiment, the film-forming compositions of the invention can further comprise at least one pigment to provide pigmented film-forming compositions. The pigmented film-forming compositions of the present invention also are suitable for use in automotive coatings applications, for example, as a primer coating, as a monocoat or in a multi-component composite coating composition as the pigmented base coating composition.

The film-forming composition of the present invention can contain, in addition to the components described above, a variety of other adjuvant materials. If desired, other resinous materials can be utilized in conjunction with the dispersion of polymeric microparticles so long as the resultant coating composition is not detrimentally affected in terms of application, physical performance and properties.

Examples of suitable adjuvant materials include aliphatic, low molecular weight urethane diol oligomers such as K-FLEX® UD-350W available from King Industries.

Other suitable adjuvant materials include hydrophilic reactive functional group-containing polysiloxanes, for example, the hydroxyl, carboxylic acid and amine functional group-containing polysiloxanes disclosed in U.S. Pat. Nos. 5,916,992 and 5,939,491 and co-pending U.S. patent application Ser. No. 08/986,812 filed Dec. 8, 1997 which are incorporated herein by reference. It should be understood that the polysiloxanes which are useful in the compositions of the present invention as adjuvant materials must be hydrophilic, that is, they are or have been adapted to be water-soluble or water dispersible.

These functional group-containing polysiloxanes typically are the hydrosilylation reaction products of a polysiloxane containing silicon hydride and a functional group-containing material having at least one unsaturated bond capable of undergoing hydrosilylation reaction. For example, 1,1,3,3-tetramethyl disiloxane and/or polymethyl polysiloxane having two or more Si-H groups can be reacted with one or more hydroxyl group-containing materials having at least one unsaturated bond capable of undergoing hydrosilylation reaction. Nonlimiting examples of suitable hydroxyl group-containing materials having at least one unsaturated bond include trimethylolpropane monoallyl ether, pentaerythritol monoallyl ether, trimethylolpropane diallyl ether, polyethoxylated allyl alcohol, polypropoxylated allyl alcohol and allyl alcohol.

Generally, if employed, the adjuvant material is present in an amount ranging from about 0.01 to about 25 weight percent on a basis of total resin solids of the film-forming composition, preferably about 0.1 to about 20 weight percent and, more preferably, about 0.1 to about 15 weight percent.

In addition, inorganic microparticles which, preferably, are substantially colorless, such as silica, for example, colloidal silica, to provide enhanced mar and scratch resistance can be present. Other suitable inorganic microparticles include fumed silica, amorphous silica, alumina, colloidal alumina, titanium dioxide, zirconia, colloidal zirconia and mixtures thereof. These materials can constitute up to 30 percent by weight of the total weight of the film-forming composition.

The solids content of the film-forming composition generally ranges from 20 to 75 weight percent on a basis of total weight of the film-forming composition, preferably 30 to 65 weight percent, and more preferably 40 to 55 weight percent.

The film-forming composition preferably also contains a catalyst to accelerate the cure reaction, for example, between the blocked polyisocyanate curing agent and the reactive hydroxyl groups of the thermosettable dispersion. Examples of suitable catalysts include organotin compounds such as dibutyl tin dilaurate, dibutyl tin oxide and dibutyl tin diacetate. Catalysts suitable for promoting the cure reaction between an aminoplast curing agent and the reactive hydroxyl and/or carbamate functional groups of the thermosettable dispersion include acidic materials, for example, acid phosphates such as phenyl acid phosphate, and substituted or unsubstituted sulfonic acids such as dodecylbenzene sulfonic acid or paratoluene sulfonic acid. The catalyst usually is present in an amount ranging from 0.1 to 5.0 percent by weight, preferably 0.5 to 1.5 percent by weight, based on the total weight of resin solids.

Other additive ingredients, for example, plasticizers, surfactants, thixotropic agents, anti-gassing agents, flow controllers, anti-oxidants, UV light absorbers and similar additives conventional in the art can be included in the composition. These ingredients typically are present in an amount of up to about 40 percent by weight based on the total weight of resin solids.

As aforementioned, the multi-component composite coating compositions of the present invention comprise a pigmented film-forming composition serving as a base coat (i.e., a color coat) and a film-forming composition applied over the base coat serving as a transparent topcoat (i.e., a clear coat). The base coat and clear coat compositions used in the multi-component composite coating compositions of the invention are preferably formulated into liquid high solids coating compositions, that is, compositions containing 40 percent, preferably greater than 50 percent by weight resin solids. The solids content is determined by heating a sample of the composition to 105° to 110° C. for 1–2 hours to drive off the volatile material, and subsequently measuring relative weight loss.

The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds and polyurethanes such as those discussed in detail above.

The resinous binders for the base coat can be organic solvent-based materials such as those described in U.S. Pat. No. 4,220,679, note column 2 line 24 continuing through column 4, line 40, which is incorporated herein by reference. Also, water-based coating compositions such as those described in U.S. Pat. No. 4,403,003, U.S. Pat. No. 4,147,679 and U.S. Pat. No. 5,071,904 (incorporated herein by reference) can be used as the binder in the base coat composition.

The base coat composition contains pigments as colorants. Suitable metallic pigments include aluminum flake, copper or bronze flake and metal oxide coated mica. Besides the metallic pigments, the base coat compositions can contain non-metallic color pigments conventionally used in surface coatings including inorganic pigments such as titanium dioxide, iron oxide, chromium oxide, lead chromate, and carbon black; and organic pigments such as phthalocyanine blue and phthalocyanine green.

Optional ingredients in the base coat composition include those which are well known in the art of formulating surface coatings, such as surfactants, flow control agents, thixotropic agents, fillers, anti-gassing agents, organic co-solvents, catalysts, and other customary auxiliaries. Examples of these materials and suitable amounts are described in U.S. Pat. Nos. 4,220,679, 4,403,003, 4,147,769 and 5,071,904, which are incorporated herein by reference.

The base coat compositions can be applied to the substrate by any conventional coating technique such as brushing, spraying, dipping or flowing, but they are most often applied by spraying. The usual spray techniques and equipment for air spraying, airless spray and electrostatic spraying in either manual or automatic methods can be used.

During application of the base coat to the substrate, the film thickness of the base coat formed on the substrate is typically 0.1 to 5 mils (about 2.54 to about 127 micrometers), preferably 0.1 to 2 mils (about 2.54 to about 50.8 micrometers).

After forming a film of the base coat on the substrate, the base coat can be cured or alternately given a drying step in which solvent is driven out of the base coat film by heating or an air drying period before application of the clear coat. Suitable drying conditions will depend on the particular base coat composition, and on the ambient humidity if the composition is water-borne, but preferably, a drying time of from 1 to 15 minutes at a temperature of 75° to 200° F. (21° to 93° C.) will be adequate.

The solids content of the base coating composition generally ranges from 15 to 60 weight percent, and preferably 20 to 50 weight percent.

The transparent topcoat (or clear coat) composition is typically applied to the base coat by spray application, however, the topcoat can be applied by any conventional coating technique as described above. Any of the known spraying techniques can be used such as compressed air spraying, electrostatic spraying and either manual or automatic methods. As mentioned above, the clear topcoat can be applied to a cured or to a dried base coat before the base coat has been cured. In the latter instance, the two coatings are then heated to cure both coating layers simultaneously. Typical curing conditions range from 265° to 350° F. (129° to 175° C.) for 20 to 30 minutes. The clear coating thickness (dry film thickness) is typically 1 to 6 mils (about 25.4 to about 152.4 micrometers).

During application of the clear coating composition to the substrate, ambient relative humidity generally can range from about 30 to about 80 percent, preferably about 50 percent to 70 percent.

In an alternative embodiment, after the base coat is applied (and cured, if desired), multiple layers of transparent coatings can be applied over the base coat. This is generally referred to as a "clear-on-clear" application. For example, one or more layers of a conventional transparent or clear coat can be applied over the base coat and one or more layers of transparent coating of the present invention applied thereon. Alternatively, one or more layers of a transparent coating of the present invention can be applied over the base coat and one or more conventional transparent coatings applied thereon.

The multi-component composite coating compositions can be applied over virtually any substrate including wood, metals, glass, cloth, plastic, foam, including elastomeric substrates and the like. They are particularly useful in applications over metals and elastomeric substrates that are utilized in the manufacture of motor vehicles. The substantially organic solvent-free topcoat film-forming compositions of the present invention provide multi-component composite coating systems that have appearance and performance properties commensurate with those provided by solvent-based counterparts with appreciably less volatile organic emissions during application.

Illustrating the invention are the following examples which, however, are not to be considered as limiting the invention to their details. Unless otherwise indicated, all parts and percentages in the following examples, as well as throughout the specification, are by weight.

EXAMPLES

The following Example A describes the preparation of an aqueous dispersion of polymeric microparticles of the present invention from a pre-formed acrylic polyol and a hydrophobic blocked polyisocyanate crosslinking agent. Comparative Example B describes the preparation of a comparative dispersion of polymeric microparticles from a polyester/acrylic polyol component and a blocked polyisocyanate crosslinking agent. Example C describes the preparation of a dispersion of polymeric microparticles where the hydrophobic polymer is prepared in the presence of the hydrophobic crosslinking agent. Example 1 describes the preparation of a transparent top coat film-forming composition of the present invention using the dispersion of Example A. Comparative Example 2 describes the preparation of a comparative transparent top coat composition using the dispersion of Comparative Example B.

Example A

Aqueous Microparticle Dispersion of an Acrylic Polyol Blended with Blocked Polyisocyanate A pre-emulsion mixture of an acrylic polyol and blocked polyisocyanate was prepared from the following ingredients:

| | |
|---|---|
| 745.70 g | Acrylic polyol[1] |
| 612.00 g | TRIXENE ™ HC1170[2] |
| 258.30 g | Methylisobutyl Ketone |
| 7.20 g | N,N-Dimethylethanolamine |
| .74 g | Dibutyltin dilaurate |
| 1622.50 g | Deionized Water |

[1]Copolymer prepared from hydroxyethyl methacrylate, 2-ethylhexyl acrylate, styrene, acrylic acid, CARDURA E (glycidyl esters of mixtures of tertiary aliphatic carboxylic acids, commercially available from Shell Chemical Company), in a 19.90:12.00:30.00:9.45:28.65 weight ratio, 65 percent solids by weight in a blend (2:1 weight ratio) of SOLVESSO-100 (aromatic hydrocarbon available from Exxon Chemical Company) and xylene.
[2]Isocyanurate of 1,6-hexamethylenediisocyanate blocked with 3,5-dimethyl pyrazole (70% solids in SHELLSOL A (naphtha available from Shell Chemical Company) and n-butyl acetate), available from Baxenden Chemicals Limited, England.

The first three ingredients were mixed at room temperature in a round bottom flask for a period of 30 minutes, at which time the N,N-dimethylethanolamine and dibutyltin dilaurate were added sequentially under agitation. Deionized water (1298.00 grams) was slowly added and the pre-emulsion mixture was stirred under 350 rpm agitation for an additional 30 minutes. The resulting pre-emulsion mixture was twice passed through a M110T MICROFLUIDIZER® emulsifier, commercially available from Microfluidics Corporation, at 8000 psi and rinsed with 324.50 grams of deionized water to produce a dispersion of polymeric microparticles.

Under agitation, two drops of FOAMKILL 649 (aliphatic hydrocarbon available from Crucible Chemical, USA) were added to the dispersion and the dispersion was heated to 40° C. in a round bottom flask suitable for azeotropic distillation at reduced pressure. Organic solvents were azeotropically distilled off at 37.50 to 41° C. and 100–200 mm Hg pressure. The resulting product was filtered through a 50 micron filter bag to yield a dispersion with a resin solids content of 39.5 percent, a pH of 8.67 and a particle size of 1954 Angstroms.

Comparative Example B

Polyester Polyol

The following describes the preparation of a polyester polyol using butyl stannoic acid as a catalyst according to the example set forth in published Canadian Patent Application No. CA 2,203,868. The polyester polyol was prepared from a mixture of the following ingredients:

| INGREDIENTS | PARTS BY WEIGHT |
|---|---|
| 2-Ethylhexanoic acid | 220.7 |
| Trimethylolpropane | 302.9 |

| INGREDIENTS | PARTS BY WEIGHT |
|---|---|
| Neopentyl glycol | 126.7 |
| Hexahydrophthalic anhydride | 322.4 |
| Adipic acid | 122.9 |
| Butyl stannoic acid | 1.8 |

All the ingredients above were introduced into a suitably equipped reaction vessel and heated under nitrogen atmosphere to 90° C. to for a homogeneous mixture. The reaction mixture was then heated gradually to a temperature of about 220° C. as approximately 115 ml. of water was removed by distillation as a by-product. The reaction product was then cooled to ambient temperature. The resulting product had a resin solids content of 97.5 percent by weight, an OH number of 97.3 mg KOH/g and an acid number of 0.7 mg KOH/g.

Polyester/Polyacrylate Polyol Component

The above polyester polyol was used to prepare a polyhydroxyl-polyester-polyacrylate prepared according to the example set forth in published Canadian Patent Application No. CA 2,203,868. The polyhydroxyl-polyester-polyacrylate was prepared from a mixture of the following ingredients.

| INGREDIENTS | PARTS BY WEIGHT |
|---|---|
| Charge I | |
| Polyester polyol from above | 297.5 |
| Dimethyl maleate | 148.8 |
| Charge II | |
| Methyl methacrylate | 595.0 |
| Styrene | 1067.6 |
| Hydroxyethyl methacrylate | 482.8 |
| Butyl methacrylate | 297.5 |
| Acrylic acid | 26.35 |
| Charge III | |
| Ditertiarybutyl peroxide | 59.5 |

Charge I was introduced into a suitably equipped igallon stainless steel pressure reactor and heated to a temperature of 160° C. Beginning simultaneously, Charge II (added over a period of 2.5 hours) and Charge III (added over a period of 3.0 hours) were metered into the sealed reactor. Upon completion of the Charge III addition, the reaction mixture was stirred for an additional 45 minutes as the temperature was increased to 200° C. to facilitate discharge from the reactor. The resulting hot product was then discharged from the reactor for cooling onto sheet aluminum trays. Once solidified, the reaction product was mechanically pulverized.

The resulting reaction product had a weight solids content of 98.4 percent, a glass transition temperature of 39.9° C., an OH number of 82.9 mg KOH/g and an acid number of 8.8 mg KOH/g.

Blocked Polyisocyanate Crosslinking Agent

A blocked polyisocyanate crosslinking agent was prepared from VESTANAT® TI 890/100, an isocyanurate of isophorone diisocyanate (commercially available from Creanova Inc., USA) using 3,5-dimethyl pyrazole as a blocking agent as follows:

| INGREDIENTS | PARTS BY WEIGHT |
|---|---|
| Charge I | |
| VESTANAT ® T1890/100 | 250.0 |
| Methyl ethyl ketone | 100.0 |
| Charge II | |
| 3,5-Dimethyl pyrazole | 106.0 |
| Charge III | |
| Methyl ethyl ketone | 7.1 |

Charge I was introduced into a suitably equipped reaction vessel and the mixture was heated to a temperature of 60° C. Charge II was then added in portions with continuous stirring and the reaction was monitored for the disappearance of the isocyanate band by infrared spectroscopy. Charge III was added as a rinse for the addition funnel of Charge II.

Aqueous Dispersion of Polymeric Microparticles

The following describes the preparation of an aqueous dispersion of polymeric microparticles using the above-described polyester/acrylate polyol component and blocked isocyanate crosslinking agent. The dispersion was prepared using the method described in published Canadian Patent Application No. CA 2,203,868, using a MICROFLUID-IZER® high pressure impingement emulsifier which is available from Microfluidics Corporation of Newton, Mass.

| INGREDIENTS | PARTS BY WEIGHT |
|---|---|
| Charge I | |
| Polyester/acrylate polyol of Example B | 350.8 |
| Blocked isocyanate crosslinking agent of Example B | 226.7 |
| Methyl ethyl ketone | 732.2 |
| Charge II | |
| N,N-dimethylethanolamine | 3.55 |
| Charge III | |
| BYK-348[1] | 3.25 |
| Charge IV | |
| EMULSIFIER WN[2] | 10.5 |
| Charge V | |
| Deionized water | 806.6 |

[1]Polyether modified dimethyl polysiloxane, leveling agent available from Byk-Chemie.
[2]Aryl polyglycol ether, emulsifying auxiliary available from Bayer AG.

Charge I was introduced into a suitably equipped 5 liter flask and stirred to dissolve the ingredients. Charge II was then added as a neutralizing agent. Charges III and IV were then sequentially added with stirring. An oil-in-water type pre-emulsion was produced by introducing Charge V to the resulting mixture under agitation using a half-moon shaped stirrer at 350 rpm. The resulting pre-emulsion mixture was then finely dispersed through a M110T MICROFLUID-IZER® at 8000 psi. After adding 750 grams of deionized water, the dispersion was heated to 35° C. as methyl ethyl ketone was removed by reduced pressure distillation. The total distillate (methyl ethyl ketone with water) collected was 1562.2 grams. The resulting aqueous polymeric dispersion had a weight solids content of 44.0 percent which was adjusted to 39.4 percent by diluting 950 grams of dispersion with 90 grams of deionized water. The average particle size of the microparticles was 4607 Angstroms (0.41 μm).

Example C

Blocked Polyisocyanate Crosslinking Agent

A blocked polyisocyanate crosslinking agent was prepared from DESMODUR N-3300, a homopolymer of 1,6-hexamethylene diisocyanate (commercially available from Bayer Corp., USA) using 3,5-dimethyl pyrazole as a blocking agent and styrene as a solvent.

| Ingredients | Parts by Weight |
|---|---|
| Charge I | |
| DESMODUR N-3300 | 700.00 |
| Styrene | 203.40 |
| 4-tert-Butylcatechol | 0.26 |
| Charge II | |
| 3,5-Dimethyl pyrazole | 346.20 |

Charge I was introduced into a suitably equipped reaction vessel and the mixture was heated to temperature of 60° C. Charge II was then added in portions with continuous stirring and the reaction was monitored for the disappearance of the isocyanate band by infrared spectroscopy.

Synthesis of Acrylic Polyol Prepared in the Presence of Blocked Polyisocyanate Crosslinking Agent A polymeric dispersion of microparticles from an acrylic polyol which was prepared from monomers which were first mixed with the above crosslinking agent, particulated, then polymerized in the presence of the crosslinking agent. The dispersion was prepared as follows:

| Ingredients | Parts by Weight |
|---|---|
| Charge I | |
| Beta-hydroxy ester functional monomer[1] | 26.40 |
| Hydroxyethyl methacrylate | 14.20 |
| 2-Ethylhexyl acrylate | 7.50 |
| Acrylic acid | 3.60 |
| Blocked polyisocyanate crosslinking prepared above | 166.30 |
| ALIPAL CO-436[2] | 11.70 |
| Deionized water | 301.30 |
| Charge II | |
| Aqueous ferrous ammonium sulfate (1% solution) | 0.30 |
| Deionized water | 2.50 |
| Charge III | |
| Isoascorbic acid | 0.50 |
| Deionized water | 7.50 |
| Charge IV | |
| ALIPAL CO-436 | 1.30 |
| Tert-butylhydroperoxide[3] | 0.75 |
| Deionized water | 250.0 |

[1]Ethylenically unsaturated, beta-hydroxy ester functional monomer prepared from acrylic acid and CARDURA E.
[2]Ammonium salt of ethoxylated nonylphenol sulfate available (58%) from Rhone-Poulenc, USA.
[3]70% in tert-butyl alcohol/water mixture, available from Atochem.

The Charge I was mixed in a suitable reaction vessel at room temperature for a period of one hour to form a pre-emulsion mixture. The pre-emulsion mixture was passed twice through a M110T MICROFLUIDIZER® emulsifier at 8000 psi to produce a microdispersion. The microdispersion was then stirred at room temperature in a round bottom flask as Charge II and III were added at 5 minute intervals and the mixture was heated to 30° C. under nitrogen. Charge IV was then added over a period of 15 minutes. In the last 5 minutes of the Charge IV addition, the temperature was allowed to increase to 41° C. The reaction mixture then heated to 70° C. and stirred for an additional one hour. The resulting product was filtered to yield a dispersion with a resin solids content of 44.1 percent.

Example 1

Transparent Topcoat Film-Forming Composition Containing The Microparticle Dispersion of Example A A transparent topcoat film-forming composition was prepared from a mixture of the following ingredients:

1.2 g Byk 345 silicone wetting additive commercially available from Byk-Chemie.

444 g Acrylic/Blocked Isocyanate Dispersion of Example A 2.59 g Borchigel LW44 Thickener at 20% solids, commercially available from Bayer Corporation 25.4 g Deionized Water The first two ingredients were added under agitation and mixed for 50 minutes. The thickener and deionized water were then slowly added to the resulting mixture and stirred under high agitation for an additional 50 minutes. Agitation was stopped and the mixture was allowed to stand at ambient conditions for 8 hours to release entrapped air.

The resulting transparent topcoat film-forming composition had a pH of 8:5 and a percent non-volatile content of 37.36. Viscosity of the composition was 60 seconds as measured using a #4 DIN cup.

Comparative Example 2

Comparative Transparent Topcoat Composition Containing The Microparticle Dispersion of Comparative Example B The aqueous dispersion of Comparative Example B was applied as a transparent topcoat composition as described in published Canadian Patent Application No. CA 2,203,868.

The transparent topcoat composition of the present invention (Example 1) was evaluated versus a solventborne two pack isocyanate clear coat commercially available from BASF Corp. as B+K HVP 15000/SC29-0317 0109

(Comparative Example 3) and the topcoat composition of Comparative Example 2.

The test substrates were ACT cold roll steel panels 10.2 cm by 30.5 cm (4 inches by 12 inches) electrocoated with a cationic electrodepositable primer commercially available from PPG Industries, Inc. as ED-5000. The panels were primed with a commercially available PPG primer surfacer coded as GPX05379 and cured for 30 minutes at 325° F. The panels were then coated with a silver basecoat (commercially available from PPG Industries Lacke GmbH as 16-173-9983) which was spray applied (two coats automated spray with 30 seconds ambient flash between coats) at 60% relative humidity and 70° F.

In one series of evaluations, the topcoat compositions were evaluated as uncured films. Test panels were prepared for each of the topcoat compositions of Example 1 and Comparative Examples 2 and 3 as described above. Once applied to the substrate, each composition was allowed to flash (or dehydrate) for a 40 minute period at ambient conditions. The dehydrated coated test panels were evaluated as follows. The panels were sprayed with water using a SATAjet handspray gun at 60 psi gun atomization air pressure. The film-forming composition of Example 1 and the solventborne composition of Comparative Example 3, both of which were observed to be coalesced and generally continuous films prior to curing, remained intact and the water merely beaded on the film surfaces. The composition of Comparative Example 2, however, which was white and had a rough, discontinuous granular appearance prior to curing, was partially removed by the water spray. Moreover, the applied film-forming compositions of the present invention (Example 1) and Comparative Example 3 were tacky to the touch and could not be removed by lightly brushing the film surface with a plastic gloved fingertip. By contrast, the applied topcoat composition of Example 2 was dry to the touch and easily removable by lightly brushing the film surface with a plastic gloved fingertip, appearing as a white powder-thereon.

In a second series of evaluations, the coated panels were cured and tested as follows. The panels were flash baked for 10 minutes at 80° C. then 10 minutes at 150° C. to give a dry film thickness of 12 to 15 micrometers. The transparent topcoat compositions were then spray applied to separate panels (single coat automated spray at 60% relative humidity and 70° F). The panels for Example 1 and Comparative Example 3 were flashed for 3 minutes at room temperature then baked for 10 minutes at 45° C. and for 30 minutes at 141° C. to give dry film thicknesses of 40 micrometers for the topcoat composition of this example, and 40–45 micrometers for the topcoat composition of Comparative Example 3. The topcoat composition of Comparative Example 2 was cured according to the curing conditions specified by the example in CA 2203868 (i.e., 1 minute ambient, 30 minutes at 141° C., ramping to 141° C. over 3 minutes).

The appearance and physical properties of the cured coated panels were measured using the following tests. Visual inspection was used to evaluate film clarity and integrity as well as to note any surface defects. Specular gloss was measured at 200 with a Novo-Gloss Statistical Glossmeter from Gardco where higher numbers indicate better performance. Distinction of Image (DOI) was measured using Hunter Lab's Dorigon II where higher numbers indicate better performance. The smoothness of the clear coats was measured using a Byk Wavescan in which results are reported as long wave and short wave numbers where lower values mean smoother films. Adhesion was tested as follows: cutting through the coating in a crosshatch pattern with a sharp knife, using a cut interval of 2 millimeters, (six vertical cuts with six horizontal cuts perpendicular to the vertical cuts, resulting in a 10 mm×10 mm grid of 2 mm×2 mm squares), applying tape (#4651 black tape from Beirsdorf) over the cut portion, sharply pulling off the tape at a 60° angle from the coating surface, and estimating the percentage of the transparent topcoating removed with the tape. No loss of adhesion is given a 0% rating and total loss of adhesion is given a 100% rating Reported VOC values were calculated according to the following formula:

$$VOC = \frac{[(1 - \text{percent total solids}) - \text{percent water}] \times \text{lb/gal}}{[1 - ((\text{percent water} \times \text{lb/gal})/8.33)]}$$

The following Table 1 provides the measured properties of the cured films.

TABLE 1

|  | Example 1 | Comparative Example 2 | Comparative Example 3 |
| --- | --- | --- | --- |
| Gloss of clear coat at 20° | 97 | 4 | 91 |
| DOI of clear coat | 77 | 1 | 90 |
| Byk long wave | 4.2 | * | 1.3 |
| Byk short wave | 12.6 | * | 7.2 |
| Adhesion | 0 (no damage) | 0 (no damage) | 0 (no damage) |
| % Gloss Retention | 57 | 75 | 62 |
| VOC (calculated) | 0.04 lb/gal | <0.1 lb/gal | ~4.0 lb/gal |
| % organic solvent | <0.5% | <0.5% | ~45% |
| Visual inspection (cured film) | clear continuous film, free of surface defects | dull, very hazy film, mud-cracking | clear continuous film, free of surface defects |

*Coating surface was too rough and discontinuous to measure properties.

As illustrated by the data presented in Table 1, the substrate coated with the substantially organic solvent-free topcoat film-forming composition of the present invention (Example 1 containing <0.5% organic solvent) exhibited appearance properties similar to those of the commercially available solventborne clear coat (Comparative Example 3 containing ~45% organic solvent). The topcoat film-forming composition of the present invention also forms a clear and continuous film which is free of mud-cracking or other surface defects, unlike the composition of Comparative Example 2 which was very hazy and exhibited mudcracking.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore we claim:

1. A film-forming composition which is substantially free of organic solvent, said film-forming composition comprising:
   at least one thermosettable aqueous dispersion comprising polyneric microparticles having a functionality adapted to react with a crosslinking agent, said microparticles prepared by mixing together under high shear conditions the following components:
   (1) at least one substantially hydrophobic polymer having reactive functional groups, said polymer having a glass transition temperature of less than 30° C.; and (2) at least one substantially hydrophobic crosslinking agent containing functional groups reactive with the functional groups of the polymer (1), wherein said film-forming composition forms a generally continuous film at ambient temperature.

2. The film-forming composition of claim 1, wherein the functional groups of polymer (1) are selected from the group consisting of hydroxyl, carbamate, carboxylic acid, blocked isocyanate, primary amine, secondary amine, amide, urea, urethane, alkoxysilane, vinyl and epoxy functional groups and mixtures thereof.

3. The film-forming composition of claim 1, wherein the polymer (1) contains carbamate functional groups.

4. The film-forming composition of claim 1, wherein the hydrophobic polymer (1) comprises the reaction product of the following reactants:

(a) at least one polymerizable, ethylenically unsaturated monomer containing acid functional groups; and (b) at least one polymerizable, functional group-containing ethylenically unsaturated monomer free of acid functional groups.

5. The film-forming composition of claim 4, wherein reactant (a) comprises a carboxylic acid group-containing ethylenically unsaturated monomer.

6. The film-forming composition of claim 5, wherein reactant (a) is selected from the group consisting of acrylic acid, methacrylic acid, beta-carboxyethyl acrylate and mixtures thereof.

7. The film-forming composition of claim 4, wherein reactant (a) is present in the hydrophobic polymer (1) in an amount sufficient to provide an acid value of up to 50 mg KOH/g.

8. The film-forming composition of claim 4, wherein reactant (b) comprises at least one hydroxyalkyl functional monomer selected from the group consisting of hydroxyethyl (meth)acrylate, hydroxypropyl (meth)acrylate, 4-hydroxybutyl (meth)acrylate and mixtures thereof.

9. The film-forming composition of claim 4, wherein reactant (b) comprises an ethylenically unsaturated, beta-hydroxy ester functional monomer.

10. The film-forming composition of claim 9, wherein the ethylenically unsaturated, beta-hydroxy ester functional monomer comprises the reaction product of reactants selected from the group consisting of the following:

(a) an ethylenically unsaturated epoxy functional monomer and a saturated carboxylic acid having at least 5 carbon atoms; and (b) an ethylenically unsaturated acid functional monomer and an epoxy compound containing at least 5 carbon atoms which is not polymerizable with the ethylenically unsaturated acid functional monomer.

11. The film-forming composition of claim 1, wherein the reactants from which the hydrophobic polymer (1) is formed further comprise reactant (c) at least one polymerizable, ethylenically unsaturated monomer different from (a) and (b).

12. The film-forming composition of claim 11, wherein reactant (c) is selected from the group consisting of vinyl aromatic monomers, alkyl esters of (meth)acrylic acid and mixtures thereof.

13. The film-forming composition of claim 1, wherein the acid value of the hydrophobic polymer (1) ranges from 0 to 50 mg KOH/g.

14. The film-forming composition of claim 1, wherein the polymer (1) is present in the thermosettable dispersion in an amount ranging from 10 to 90 weight percent based on total resin solids weight of the dispersion.

15. The film-forming composition of claim 1, wherein the substantially hydrophobic crosslinking agent (2) is selected from the group consisting of blocked isocyanates, aminoplast resins, and mixtures thereof.

16. The film-forming composition of claim 13, wherein the substantially hydrophobic crosslinking agent (2) is an isocyanurate of 1,6-hexamethylene diisocyanate reversibly blocked with 3,5-dimethyl pyrazole.

17. The film-forming composition of claim 1, wherein the hydrophobic crosslinking agent (2) is present in the thermosettable dispersion in an amount ranging from 5 to 90 weight percent based on total weight of resin solids present in the dispersion.

18. The film-forming composition of claim 1, further comprising inorganic microparticles ranging in size from 1 to 1000 nanometers prior to incorporation into the film-forming composition.

19. The film-forming composition of claim 18, wherein the inorganic microparticles are selected from the group consisting of fumed silica, amorphous silica, colloidal silica, alumina, colloidal alumina, titanium dioxide, zirconia, colloidal zirconia and mixtures thereof.

20. The film-forming composition of claim 1, further comprising at least one hydrophilic crosslinking agent.

21. The film-forming composition of claim 20, wherein the hydrophilic crosslinking agent is selected from the group, consisting of hydrophilically modified blocked polyisocyanates, aminoplast resins, tricarbamoyl triazine compounds and mixtures thereof.

22. The film-forming compositions of claim 20, wherein the hydrophilic crosslinking agent is present in the film-forming composition in an amount ranging from 0 to 70 weight percent based on total weight of resin solids present in the composition.

23. The film-forming composition of claim 1, further comprising at least one pigment.

24. A substrate coated with the film-forming composition of claim 1.

25. The film-forming composition of claim 1, wherein the polymer (1) has a glass transition temperature of less than 25° C.

26. A film-forming composition which is substantially free of organic solvent, said film-forming composition comprising at least one thermosettable aqueous dispersion comprising polymeric microparticles having a functionality adapted to react with a crosslinking agent, said microparticles prepared by the sequential steps of (A) mixing together to form a pre-emulsion mixture the following components:

(1) at least one polymerizable ethylenically unsaturated, monomer, at least one of which contains reactive functional groups; and (2) at least one substantially hydrophobic crosslinking agent containing functional groups reactive with the functional groups of (1);

(B) applying high shear to said pre-emulsion mixture to form microparticles comprised of (1) and (2); and (C) subjecting said microparticles to polymerization conditions sufficient to polymerize the ethylenically unsaturated monomers (1) to form a substantially hydrophobic polymer having a glass transition temperature of less than 30° C. in the presence of the hydrophobic crosslinking agent (2), wherein said film-forming composition forms a generally continuous film at ambient temperature.

27. The film-forming composition of claim 26, wherein the monomers (1) are polymerized to form a substantially hydrophobic polymer having a glass transition temperature of less than 25° C.

* * * * *